(12) United States Patent
Trainer et al.

(10) Patent No.: US 9,184,591 B2
(45) Date of Patent: Nov. 10, 2015

(54) ELECTRICAL SYSTEM

(71) Applicant: ROLLS-ROYCE PLC, London (GB)

(72) Inventors: David Reginald Trainer, Alvaston (GB); Konstantinos Kampisios, Nottingham (GB); Omar Jasim, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 111 days.

(21) Appl. No.: 14/085,117

(22) Filed: Nov. 20, 2013

(65) Prior Publication Data

US 2014/0139168 A1 May 22, 2014

(30) Foreign Application Priority Data

Nov. 21, 2012 (GB) .................................. 1220890.6

(51) Int. Cl.
*H02P 13/00* (2006.01)
*H02J 3/18* (2006.01)
*H02P 5/74* (2006.01)

(52) U.S. Cl.
CPC ................. *H02J 3/1878* (2013.01); *H02P 5/74* (2013.01); *Y10T 307/549* (2015.04)

(58) Field of Classification Search
USPC .......... 318/663, 654, 656, 780, 813; 363/171, 363/153, 64, 44, 126, 48, 37, 34, 154, 40, 363/67, 45
See application file for complete search history.

(56) References Cited

U.S. PATENT DOCUMENTS

| | | | |
|---|---|---|---|
| 4,308,575 A * | 12/1981 | Mase .............................. 363/48 |
| 4,441,064 A * | 4/1984 | Cutler et al. ................... 318/798 |
| 4,876,634 A | 10/1989 | Paice |
| 5,666,277 A * | 9/1997 | Bjorklund et al. ............... 363/64 |
| 5,835,364 A * | 11/1998 | DeWinter et al. ............... 363/45 |
| 6,016,262 A * | 1/2000 | Karlsson .......................... 363/67 |
| 6,101,113 A * | 8/2000 | Paice ............................ 363/126 |
| 7,514,898 B2 | 4/2009 | Djuve et al. |
| 2002/0186112 A1* | 12/2002 | Kamath ............................. 336/5 |
| 2005/0057949 A1* | 3/2005 | Kim et al. ........................ 363/37 |
| 2005/0135126 A1* | 6/2005 | Gazel et al. ...................... 363/67 |
| 2007/0247878 A1* | 10/2007 | Djuve et al. ...................... 363/44 |
| 2009/0167225 A1* | 7/2009 | Dooley et al. ............. 318/400.25 |
| 2010/0118568 A1* | 5/2010 | Helle et al. ....................... 363/34 |

(Continued)

FOREIGN PATENT DOCUMENTS

CN 101 316 068 A 12/2008
CN 102751886 A 10/2012

(Continued)

OTHER PUBLICATIONS

Mar. 21, 2013 Search Report issued in British Patent Application No. GB 1220890.6.

(Continued)

*Primary Examiner* — Shawki S Ismail
*Assistant Examiner* — Jorge L Carrasquillo
(74) *Attorney, Agent, or Firm* — Oliff PLC

(57) ABSTRACT

This invention relates to a multiple phase electrical system, including: a first and a second electrical lane, each lane having a generator and a load connected by a bus system, and a rectifier between the generator and load; and, a transformer connected between the two lanes, the transformer having a plurality of power windings across each of which corresponding phases of the first and second lanes are connected, and a plurality of phase shift windings.

10 Claims, 4 Drawing Sheets

(56) References Cited

U.S. PATENT DOCUMENTS

| | | | |
|---|---|---|---|
| 2010/0176755 A1* | 7/2010 | Hoadley et al. | 318/105 |
| 2011/0216564 A1* | 9/2011 | Swamy | 363/126 |
| 2013/0181643 A1* | 7/2013 | Feng et al. | 318/400.3 |

FOREIGN PATENT DOCUMENTS

| | | |
|---|---|---|
| EP | 0 730 333 A2 | 9/1996 |
| EP | 2 451 041 A1 | 5/2012 |
| WO | 93/23914 A1 | 11/1993 |
| WO | WO 2010/066842 A2 | 6/2010 |
| WO | 2010/092113 A1 | 8/2010 |

OTHER PUBLICATIONS

Hoevenaars, A.H., et al. "Meeting New Marine Harmonic Standards." Petroleum and Chemical Industry Technical Conference. 2008, pp. 1-9.

Xu, Xiaoyan, et al. "New Concept of Power Quality Improvement Method in Marine Electric Propulsion System." International Conference on Harmonics and Quality of Power. Sep. 2004, pp. 211-214.
Aug. 24, 2015 European Search Report issued in European Patent Application No. 13 19 3636.

* cited by examiner

R_S = Rphase - Short winding
R_L = Rphase - Long winding

ELECTRICAL SYSTEM

TECHNICAL FIELD OF INVENTION

This invention relates to multiple phase electrical systems in which AC power is rectified such that there is potential for parasitic 5th and 7th order harmonic currents in the network. In particular, the invention is concerned with electrical drive systems in which AC power is supplied to an electrical motor via a rectifying arrangement. The invention is particularly advantageous for the marine and aerospace industries, but may be of application in other areas of technology.

BACKGROUND OF INVENTION

A known phenomenon in rectified electrical systems is the harmonics which are introduced by the rectification units. Typically, for a six pulse system, these harmonics are significant in the 5th and 7th order. Such harmonics can result in the associated electrical equipment being effectively over rated in relation to the electrical power required by the supplied loads.

FIG. 1 shows an electrical system 10 which seeks to reduce the effect of the 5th and 7th harmonics by providing a so-called dual lane twelve pulse power supply for an electrical drive. Each of the lanes 12, 14 includes a generator 16a, 16b, a transformer 18a, 18b and a twelve pulse rectifier unit 20a, 20b, which includes two six diode bridges 22a, 22b. The twelve pulse rectifier provides DC power to a load 24a, 24b. The load 24a, 24b can be any which requires DC power, such as an electric motor or a convertor for supplying power to an AC (or DC) load. The transformer 18a, 18b is of the star-delta, YD, type and is used to provide a thirty (30) degree phase difference in the output branches which allows a reduction in the harmonic content of output from the rectifier unit 20a, 20b. The use of YD arrangements to provide a thirty degree phase shift is well known.

FIG. 2 shows an alternative electrical system 210 in the form of an electrical propulsion arrangement in which power is provided to two electrical propulsive motors 224a, 224b via a convertor 228a, 228b. Each convertor 228a, 228b receives DC power from a six pulse rectifier 220a, 220b which is connected to an AC supply in the form of a generator 216a, 216b. The two fully rated three winding transformers 18a, 18b shown in FIG. 1 have been removed in the system of FIG. 2 and replaced with a two winding star-delta, YD, transformer 218 which is located between and electrical couples the two buses 226a, 226b of the two lanes 212, 214. With equal loading of each electrical motor 224a, 224b, the YD connected transformer 218 provides a path for the circulation of the dominant 5th and 7th harmonic currents generated by each diode bridge rectifier 220a 220b and prevents these undesirable currents from flowing in each of the generators 216a, 216b. Given these harmonic currents are typically 30% of the main fundamental frequency currents, the bus coupling transformer 218 can be of a substantially lower rating in comparison to the three winding transformers shown in FIG. 1.

A further known improvement to the described scheme is a tertiary winding (not shown) to provide a YYD transformer which incorporates a high frequency harmonic filter. Such a filter can further improve the generator current by reducing 11th and 13th harmonic current components.

U.S. Pat. No. 7,514,898 provides an example of a known YD connected transformer for filtering 5th and 7th harmonic currents.

The present invention seeks to provide an improved electrical arrangement for providing rectified electrical power.

STATEMENTS OF INVENTION

This invention provides a multiple phase electrical system according to the appended claims. In particular, the system may comprise: a first and a second electrical lane, each lane having a generator and a load connected by a bus system, and a rectifier between the generator and load; and, a transformer connected between the two lanes, the transformer having a plurality of power windings across each of which corresponding phases of the first and second lanes are connected, and a plurality of phase shift windings; characterised in that: the transformer further comprises a filter (544) provided between the mid points of the power windings.

Having a plurality of power windings and a plurality of phase shift windings allows the construction of the transformer to be simplified and lighter than prior art solutions.

The electrical generators may be driven electrically out of phase and the respective electrical lengths of the power windings and phase shift windings are such that the phase shift is matched across the power winding.

The power winding and phase shift winding of the transformer may be serially connected so as to provide an autotransformer.

The connection through the power windings may at least partially cancel 5th and 7th harmonic currents between the two lanes when in use.

The first and second lanes may be 30 degrees electrically out of phase.

The power winding may be electrically shorter than the phase shift winding.

The arrangement may include a filter on each lane. The filter may be arranged to remove higher order harmonic currents. The filter may be an RLC filter. The higher order harmonics may be above 7th order. The higher order harmonics may be 11th and 13th harmonic currents. The filter may be tuned to the 12th order harmonic of the fundamental frequency.

Each phase has a filter branch may extend between a midpoint of the power winding to a common coupling point to which each of the filters is coupled.

The filter may be an RLC filter. Each filter branch may include a capacitor with the inductance and resistance of the filter being provided by the power windings.

The load may be an electrical machine having a dual channel stator.

In a second aspect, the present invention provides an aircraft or marine vessel including the electrical system of the first aspect.

DESCRIPTION OF DRAWINGS

Embodiments of the invention will now be described with the aid of the following drawings of which.

DETAILED DESCRIPTION OF INVENTION

Figure 1:
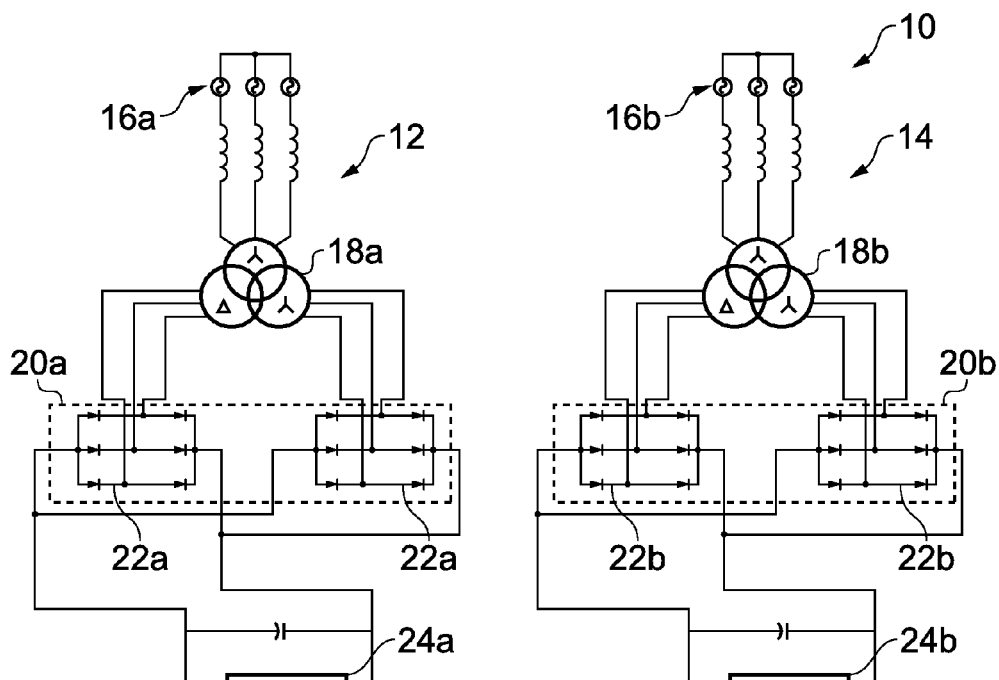
FIG. 1 shows a prior art arrangement as described above
Figure 2:
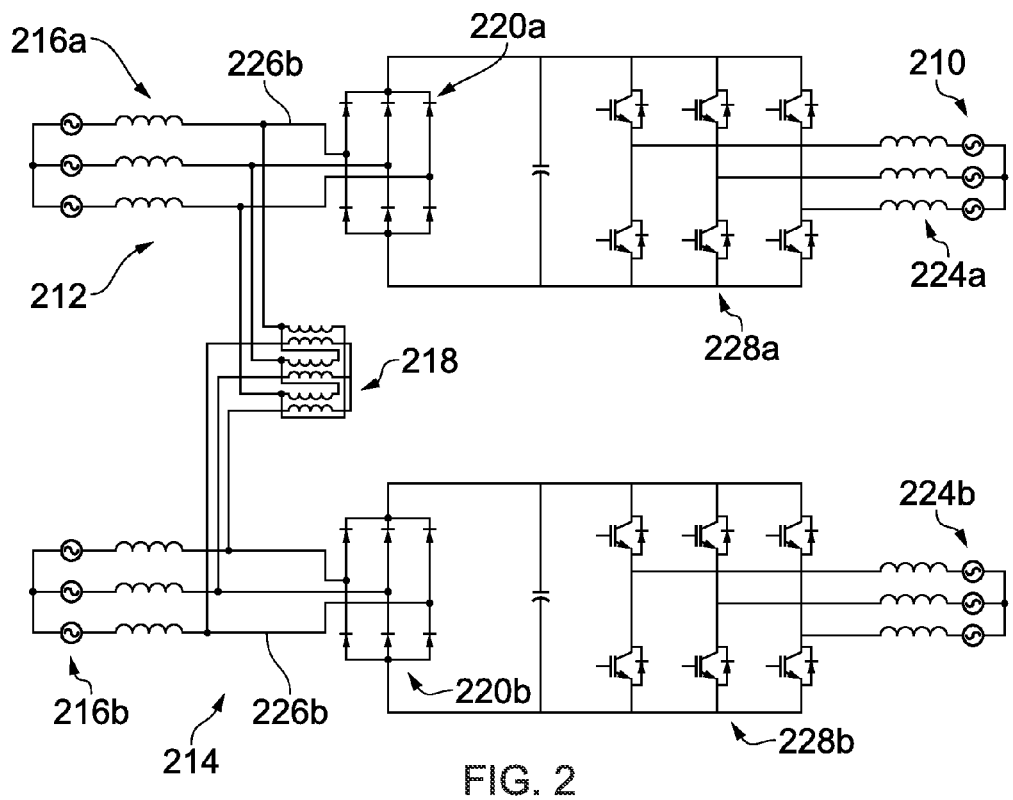
FIG. 2 shows a second prior art arrangement as described above
Figure 3:
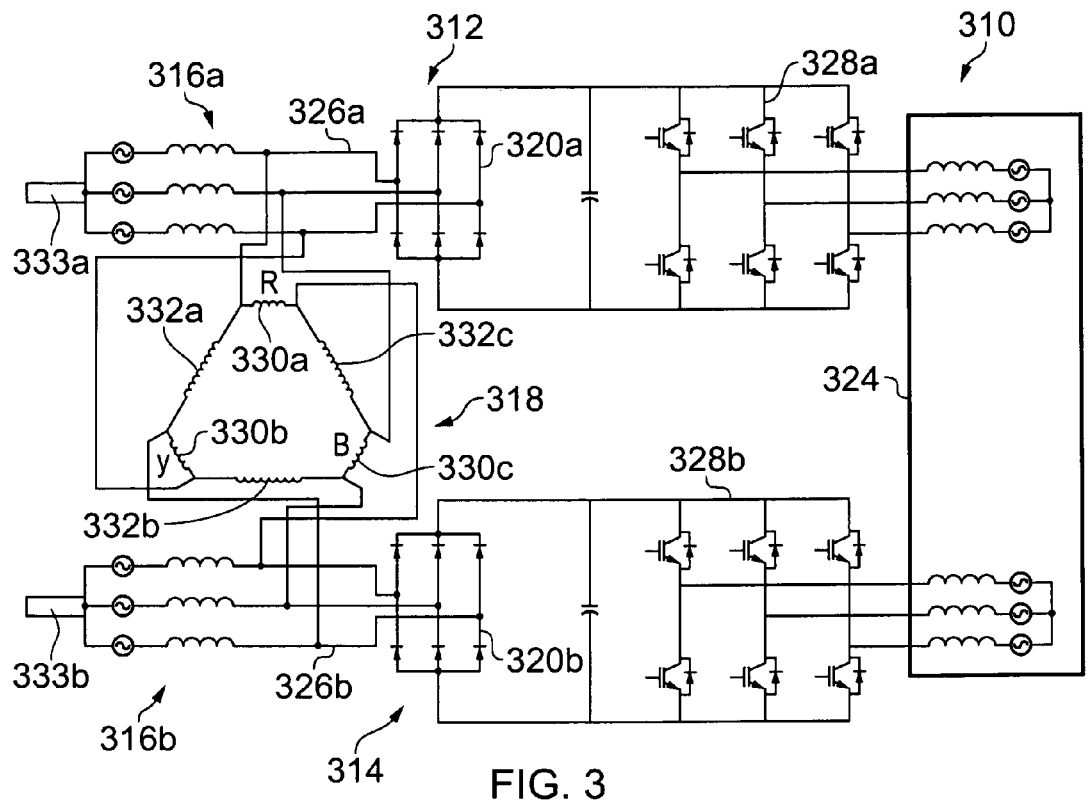
FIG. 3 shows an electrical system according to the present invention

FIG. 3 shows a three phase electrical system 310 according to the present invention. The electrical system 310 includes two lanes 312, 314, each of which have a generator 316a,b, a diode rectifier 320a,b, a convertor 328a,b and an electrical load in the form of a motor 324. The motor 324 of the described embodiment is a two channel motor having two independently fed stator windings which are arranged to drive a common rotor. The generators 316a,b and diodes 320a,b of each lane 312, 314 are electrically connected via a bus 326a,b.

The two lanes 312, 314, specifically the buses 326a,b, are electrically connected via a transformer arrangement 318 in the form of a polygon autotransformer which includes a plurality of power windings 330a-c, one for each phase, and a plurality of interconnecting phase shift windings 332a-c. Thus there are a total of six windings, with the respective phases of each of the lanes 312, 314 being connected across one of the power windings 330a-c.

Figure 4:
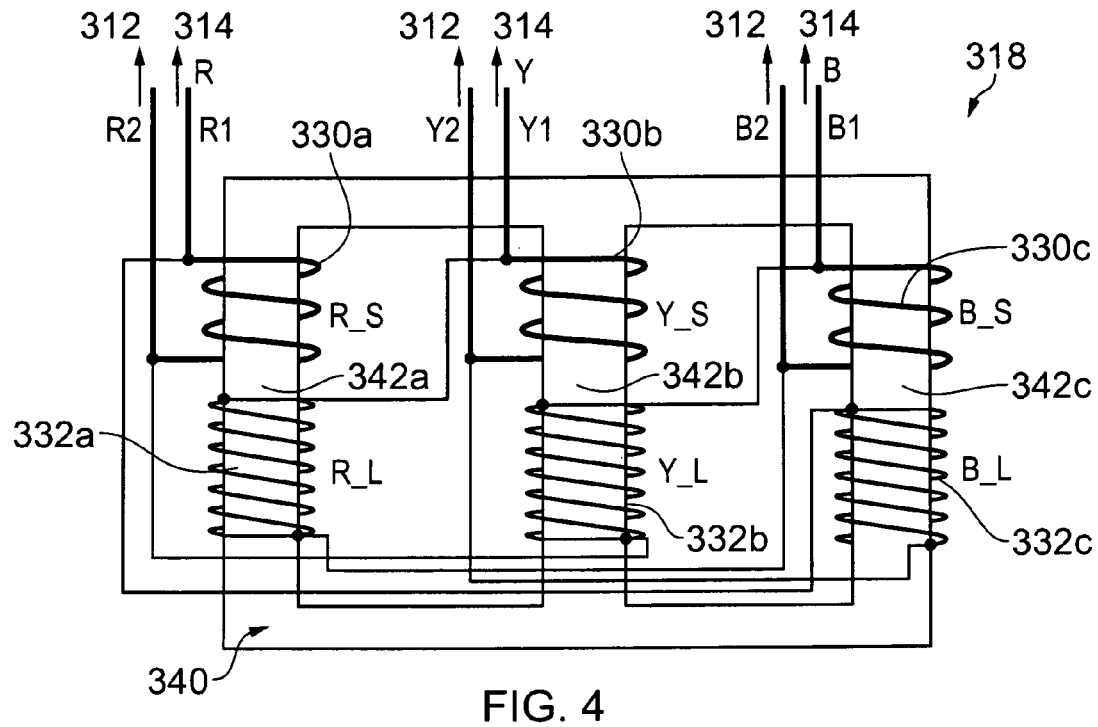
FIG. 4 shows a schematic arrangement of a transformer arrangement which may be utilised in the present invention

The construction of the transformer 318 is shown in FIG. 4 where there is a schematic representation of a magnetic flux guide in the form of a core 340 made from a low magnetic permeability material having three limbs 342a-c, one for each phase, with a power winding 330a-c and a phase shift winding 332a-c wound around each to provide the necessary flux linkage. The windings 330a-c, 332a-c are generally arranged so as to be serially connected thereby providing an autotransformer into which the phases (R, Y, B) of each lane are connected.

As is known in the art and described above, the cancellation of 5th and 7th harmonic currents in dual lane six pulse rectified systems can be achieved when the lanes of the system are offset by 30 degrees. The arrangement of the windings 330a-c, 332a-c in the described embodiment are such that the respective lengths of the power 330a-c and phase 332a-c windings result in a phase shift between the respective ends of the power windings 330a-c, and thus the two lanes 312, 314. In the present embodiment, the turn ratio of the phase windings 332a-c to the power windings 330a-c is approximately 1:0.37 which corresponds to an impedance ratio of 1:0.134 (or 7.46:1) such that the power windings 330a-c result in the required 30 degree phase shift between the respective ends. Thus, when the first and second generators 316a,b are driven so as to provide outputs of similar magnitude but 30 degrees out of phase, the only current to flow through the power windings 330a-c are the 5th and 7th harmonic currents originating from the rectifiers. As these currents are 180 degrees out of phase with one another, they cancel, thereby making the transformer a sink for the 5th and 7th harmonic currents.

The described embodiment is particularly advantageous because all of the harmonic currents flow through the power winding 330a-c which can be rated accordingly. The phase shift windings 332a-c provide the necessary phase shift between the power windings 330a-c only and so have little to no real power flowing through them. Hence, the phase shift windings 332a-c can be of a reduced rating relative to the power windings 330a-c. Having a short winding of a higher rating and a longer winding of a lower rating means that the arrangement can be considerably lighter and less materially expensive than the systems of the prior art. It will be appreciated that the phase windings may have significant power flow in some embodiments and so may need to have a higher rating.

Figure 5:
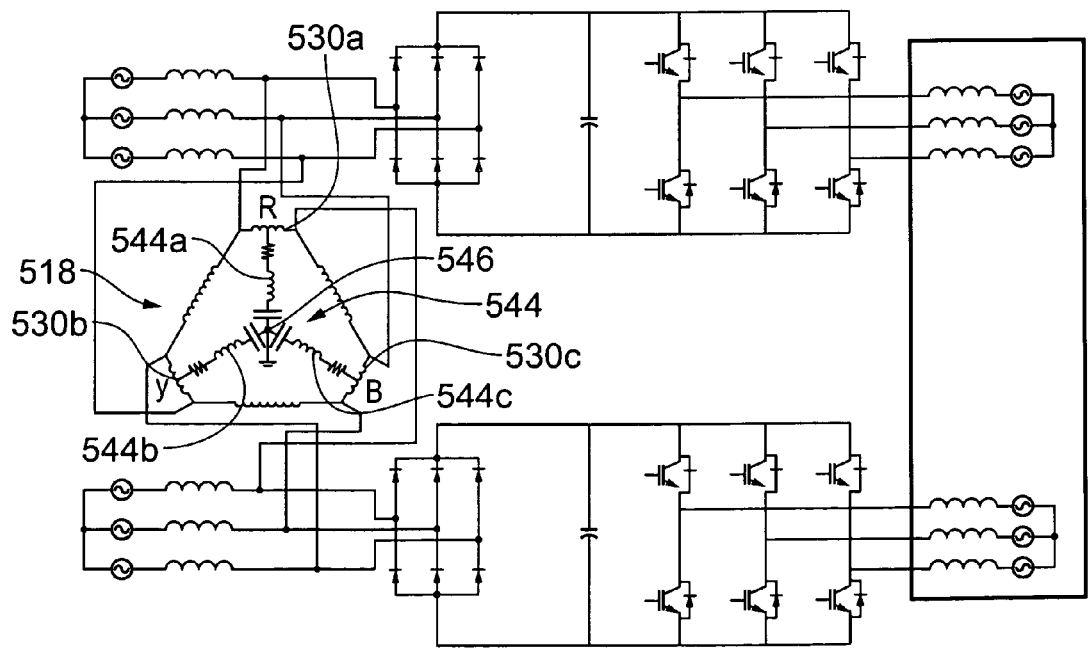
FIG. 5 shows an alternative embodiment of the present invention in which the transformer includes an embedded passive harmonic filter

In FIG. 5, there is shown a further embodiment of the invention in which the transformer 518 includes a filter arrangement 544. The filter arrangement 544 includes three RLC branches 544a-c which are connected at a first end to one of the power windings 530a-c, and at a second end to each other at a common coupling point 546. The connection at the first end is centre tapped to the power windings 530a-c so as to provide a symmetrical impedance path to the filter 544. The filter 544 is tuned to attenuate the higher harmonic currents which result from the rectifiers. These are typically the 11th and 13th harmonics. In practice the attenuation is achieved by the tuning the filter to the 12th harmonic frequency.

Although each branch of the filter 544 includes an inductor and resistor, in certain advantageous embodiments, the inductance and resistance required for the filter may be provided by the power windings 530a-c. In this case, the filtering branches between the power windings 530a-c would be predominantly capacitive with the potential for the links to be achieved with capacitors alone.

The inclusion of the filter in this way is particularly advantageous as it removes the need for a tertiary winding as taught by the prior art systems, thereby providing a preferable construction.

Figure 6:
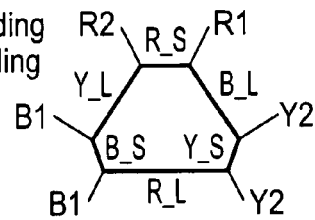
FIG. 6 shows an alternative filter arrangement
Figure 6:
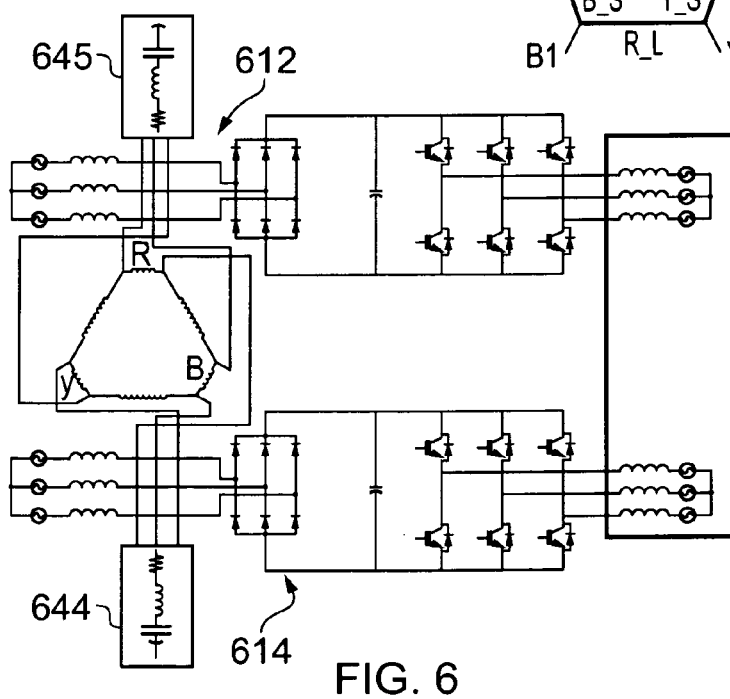

FIG. 6 shows an electrical system which includes an alternative filter arrangement 618 in which individual RLC filters 644, 645 are connected to each of the two lanes 612, 614. Returning to FIG. 3, in operation, the electrical generators 316a,b are driven by a prime mover 333a,b. The prime mover 333a,b may be any suitable type such as a diesel or a gas turbine engine, for example. The generators 316a,b output AC power on to the buses 326a,b of each lane 312, 314 and energy flows though the system for utilisation by the motor 324. As noted above, the generators are driven so as to provide similar levels of the power to each lane with a 30 degree phase shift therebetween. If this is not maintained, then the rating of the transformer must be increased to account for the resultant power flow between the lanes 312, 314. That is, the transformer and winding ratios must change so as to maintain the thirty degree phase shift between the two ends of each of the short winding 330a-c transformers.

Figure 7:
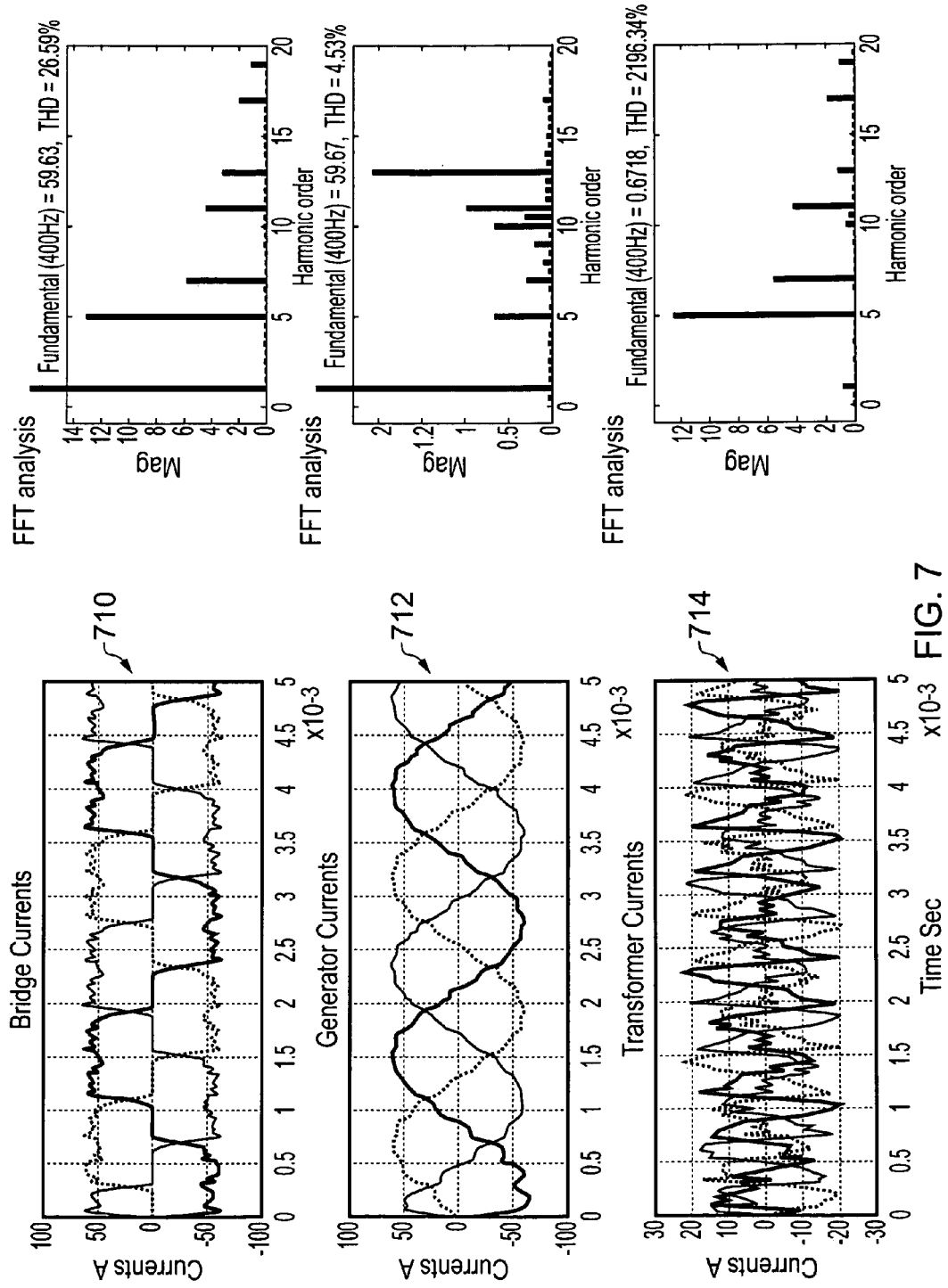
FIG. 7 shows the current waveforms and FFT plots for an exemplary electrical system

FIG. 7 shows the currents which flow within the rectifier 710, generator 712 and transformer 714 for a given application of the filtered transformer shown in FIG. 5, with corresponding Fast Fourier Transforms, FFT, on the right hand side of drawing. The presence of the 5th, 7th, 11th and 13th harmonic currents can be clearly seen in the FFT of the rectifier currents and the transformer currents. These same currents can clearly be seen to be attenuated in the generator currents, thereby demonstrating the effective nature of the transformer and associated embedded passive filter. The total harmonic distortion in the generator in this instance is reduced to around 4.5% versus 26.6% in the rectifier.

It will be appreciated that the invention finds particular utility in islanded networks. By islanded, it is meant none grid connected networks having low electrical inertia. Such networks may be found in numerous applications, for example, marine propulsion systems and aircraft systems. In some embodiments, the invention may be utilised to drive various motors on an aircraft such as electrical oil pumps and the like.

The invention is generally applicable to all dual channel or lane electrical systems. However, it is envisaged that three and four lane channelled systems may employ the invention. Although the motor is shown as dual channel in the above embodiments, it will be appreciated that other drives and electrical loads may be advantageously driven using the system of the invention. For example, the loads may be drives for a marine vessel.

It will be appreciated that other transformer arrangements may be possible within the scope of the invention. For example, the transformer may be a so-called top hat transformer in which the phase shift windings connect between the mid points of the power windings rather than the end points.

Although the above described examples relate to cancellation of 5th and 7th harmonic currents, it is envisaged that the general arrangement may be advantageously used in other scenarios. In this instance the power and phase shift windings may be arranged to match or provide a phase shift other than 30 degrees between the lanes of the electrical system.

The invention claimed is:

1. A multiple phase electrical system, comprising:
   a first and a second electrical lane, each lane having a generator and a load connected by a bus system, and a rectifier between the generator and load;
   a transformer connected between the two lanes, the transformer having a plurality of power windings across each of which corresponding phases of the first and second lanes are connected, and a plurality of phase shift windings, each power winding being electrically shorter than each phase shift winding; and
   a filter provided between mid-points of the power windings to remove higher order harmonic currents, the filter having a plurality of filter branches, each filter branch corresponding to one of the phases, and each filter branch having a first end directly connected to a mid-point of a respective one of the power windings so as to be center-tapped to the respective one of the power windings and having a second opposite end directly connected to a common coupling point of the plurality of filter branches.

2. A multiple phase electrical system as claimed in claim 1 wherein the electrical generators are driven electrically out of phase and the respective electrical lengths of the power windings and phase shift windings are such that the phase shift is matched across the power winding.

3. A multiple phase electrical system as claimed in claim 1 wherein the power winding and phase shift winding of the transformer are serially connected so as to provide an autotransformer.

4. A multiple phase electrical system as claimed in claim 1 wherein the connection through the power windings at least partially cancels 5th and 7th harmonic currents between the two lanes when in use.

5. A multiple phase electrical system as claimed in claim 1 wherein the first and second lanes are 30 degrees electrically out of phase.

6. A multiple phase electrical system as claimed in claim 1 further comprising a filter on each lane, wherein the lane filter is arranged to remove higher order harmonic currents.

7. A multiple phase electrical system as claimed in claim 1, wherein the filter is an RLC filter, and each filter branch includes a capacitor with the inductance and resistance of the filter being provided by the power windings.

8. A multiple phase electrical system as claimed in claim 1, wherein the higher order harmonics are above 7th order.

9. A multiple phase electrical system as claimed in claim 1 wherein the load is an electrical machine having a dual channel stator.

10. An aircraft or marine vessel including the electrical system of claim 1.

* * * * *